Figure 2:
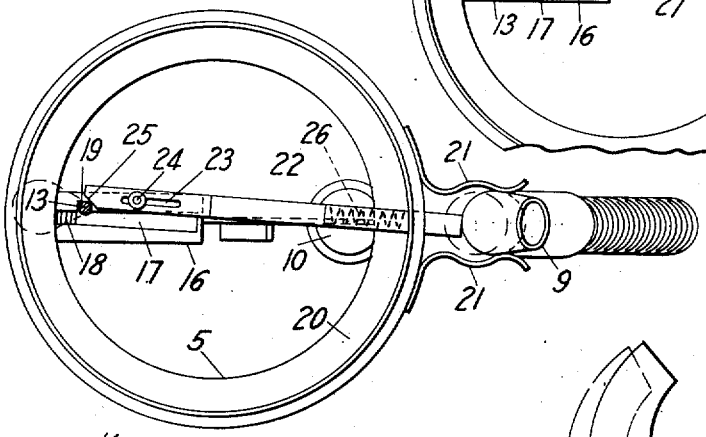

July 11, 1933.

P. D. FULTON

LIQUID DISPENSING CAN

Re. 18,891

Original Filed Jan. 9, 1930

2 Sheets-Sheet 1

INVENTOR.
PAUL D. FULTON.
By
Edward C. Reed
ATTORNEY.

July 11, 1933.

P. D. FULTON

LIQUID DISPENSING CAN

Original Filed Jan. 9, 1930

Re. 18,891

2 Sheets-Sheet 2

INVENTOR.
PAUL D. FULTON.
By
Edmund C. Reid
ATTORNEY.

Reissued July 11, 1933

Re. 18,891

UNITED STATES PATENT OFFICE

PAUL D. FULTON, OF DAYTON, OHIO, ASSIGNOR TO THE HUFFMAN MANUFACTURING COMPANY, OF DAYTON, OHIO, A CORPORATION OF OHIO

LIQUID DISPENSING CAN

Original No. 1,901,504, dated March 14, 1933, Serial No. 419,605, filed January 9, 1930. Application for reissue filed April 29, 1933. Serial No. 669,373.

This invention relates to liquid dispensing cans and more particularly to the type of measuring can which is commonly employed for delivering oil to the crank case of an automobile, the present invention being an improvement on the device shown and described in Patent No. 1,783,457, granted to R. G. Wilson and R. M. Wilson on December 2, 1930.

In oil measuring cans of this type the oil is discharged from the lower portion of the can through a tiltable spout which is retained normally in an upright position but may be lowered into an operative position to permit of the discharge of the oil therethrough. The discharge of the oil through the spout is controlled by a valve which is actuated by a suitable operating device and means are provided for retaining the operating device in a position to hold the valve open during the discharge of the oil. It sometimes happens that the can will be filled with the spout in its upright position but with the valve open, thereby causing the spout to be filled to the same level as the can. This results not only in the delivery of an excess quantity of oil but when the spout is lowered the oil will spurt therefrom before the spout can be inserted in the crank case, thus causing a waste of oil and causing oil to be splashed over the engine. In the Wilson patent above referred to the spout retaining device is of such a character that the spout cannot be inserted therein when the valve is open.

One object of the present invention is to provide a liquid dispensing can of this character having means for causing the valve to be closed whenever the spout is moved to its upright position.

A further object of the invention is to provide such a dispensing can having means for positively releasing the valve operating device, to permit the valve to be closed, when the spout is in its upright position.

A further object of the invention is to provide such a dispensing can having a valve releasing device so arranged with relation to the device for retaining the spout in an upright position that the spout cannot be operatively engaged with its retaining device without releasing the valve and causing the same to be closed.

A further object of the invention is to provide such a device which will be very simple in its construction and operation and which will not interfere with the normal use of the dispensing can.

Other objects of the invention will appear as the device is described in detail.

Figure 3:
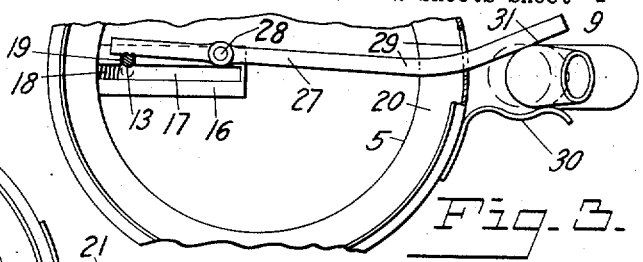
Figure 1:
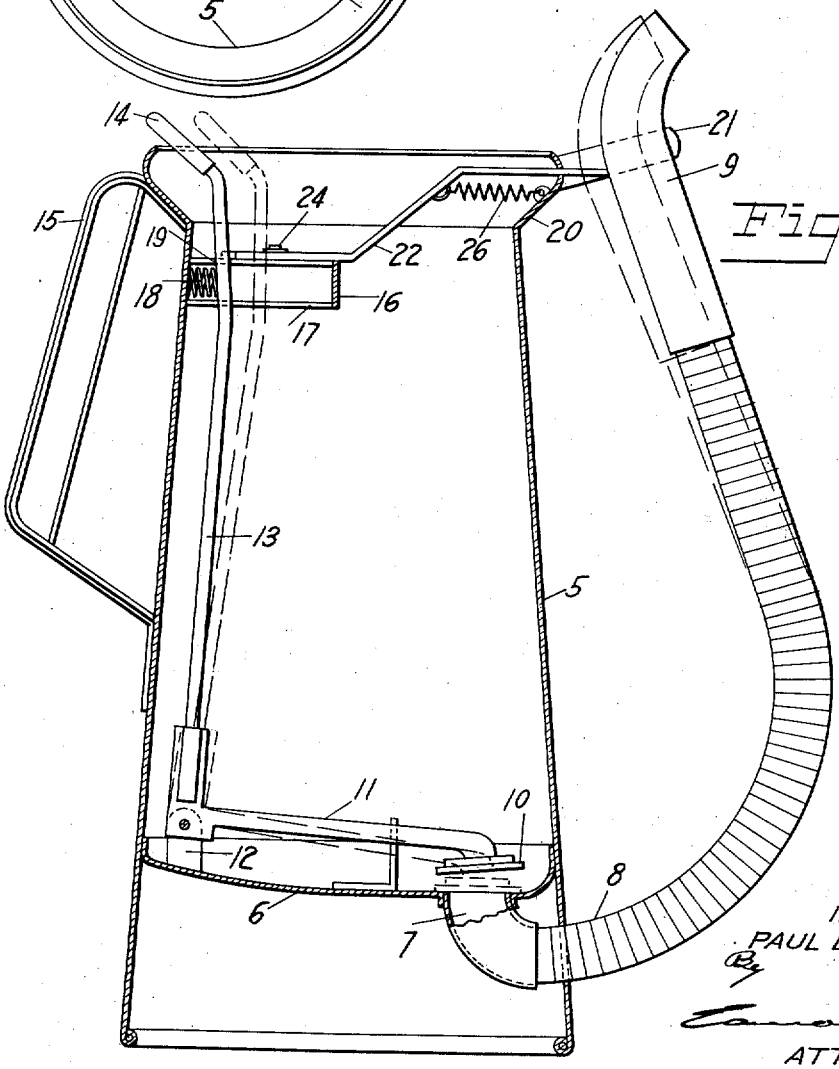
Figure 4:
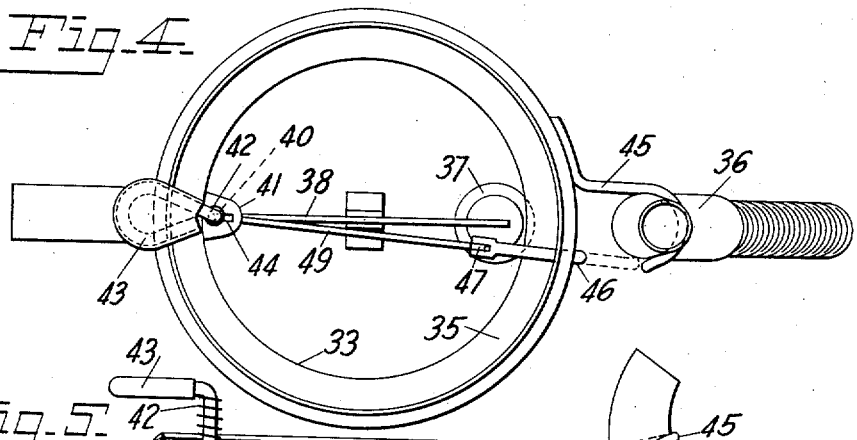
Figure 5:
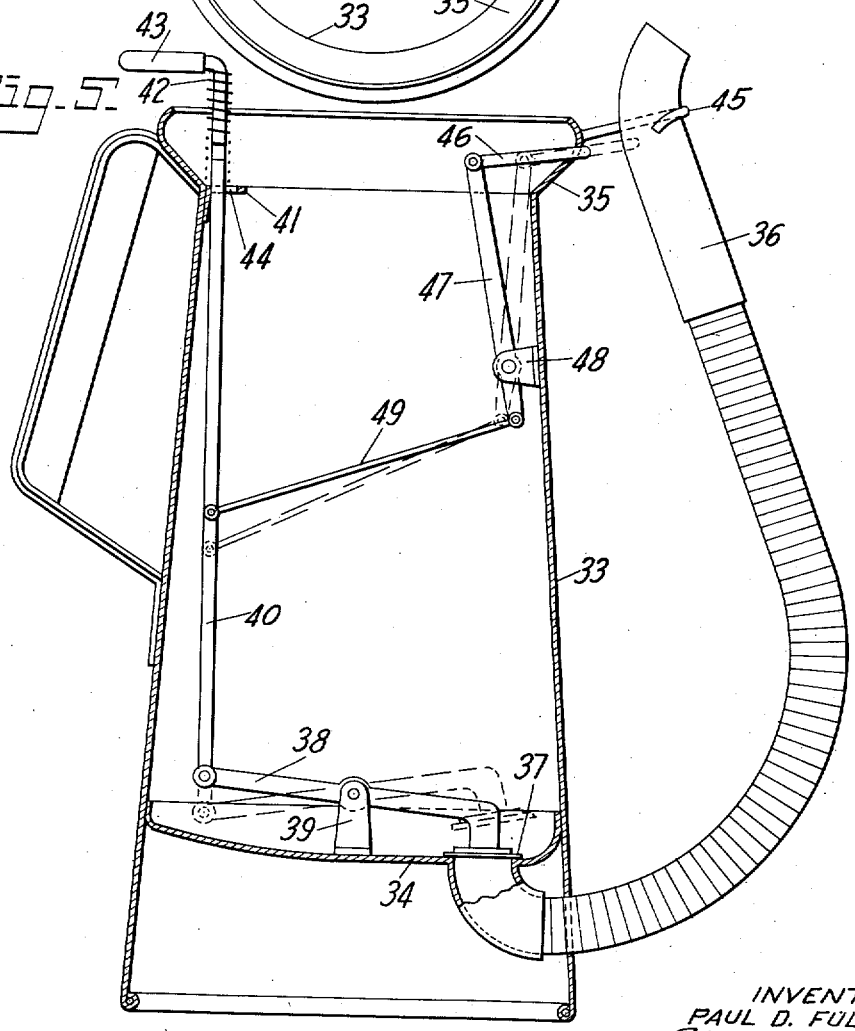

In the accompanying drawings Fig. 1 is a vertical sectional view taken through a can equipped with my invention; Fig. 2 is a top plan view of such a can; Fig. 3 is a plan view of a portion of such a can showing a slightly modified form of the invention; Fig. 4 is a top plan view of a can equipped with another form of the invention; and Fig. 5 is a vertical section taken through the can of Fig. 4.

In these drawings I have illustrated several embodiments of the invention and have shown the same as applied to an oil measuring can of a well known type but it will be understood that the invention may take various forms and may be applied to liquid dispensing cans of various kinds.

The spout may be retained in its upright position by any suitable means, the character of this retaining means depending in part upon the character of the spout. In the several embodiments here illustrated the spout is of a flexible type and the retaining means is placed near the top of the can and comprises a stationary member of such a character that the spout, when in operative engagement therewith, will be held in an upright position, but when the spout is of the rigid type it is usually held in its upright position by friction means applied to the lower end thereof. The valve controlling device may be of any suitable character and may be arranged in any suitable relation to the spout retaining means. It may be of such a character and so arranged that it will be actuated by the spout to cause the valve to be closed when the spout is moved to its upright position, and when the retaining means is at the top of the can it may be so arranged as to prevent the spout from operatively engaging its retaining means until the valve has been closed, and it may, if desired, be so arranged that it forms a part of the spout retaining means; or it may be so connected with the valve operating device as to be actuated thereby and so arranged that when the valve is open the controlling device will be in a position to prevent the spout from engaging its retaining means but will be withdrawn from that position when the valve is closed.

In that particular embodiment of the invention illustrated in Figs. 1 and 2 the measuring can comprises a receptacle 5 having its bottom 6 spaced some distance from the lower end thereof and provided with a discharge opening 7. Connected with the discharge opening 7 is a tiltable spout which, in the present instance, comprises a section of flexible hose 8 having at its outer end a discharge nozzle 9. The discharge of the oil through the opening 7 is controlled by a valve 10 which may be operated in any suitable manner. As here shown, the valve is carried by a lever 11 pivotally mounted on a bracket 12. Rigidly secured to the lever 11 is an actuating rod 13 which extends upwardly along the side of the can to a point near the top thereof where it is provided with a thumb piece 14 which is arranged above and adjacent to a handle 15 by means of which the can is supported. The operating rod 13 extends through a guide 16 having a longitudinal slot 17 in which the rod may have movement to operate the valve. A spring 18 acts on the rod to move the same in a direction to close the valve. Any suitable means may be provided for retaining the operating rod in its retracted position, in which position the valve will be held open. In the present construction the guide 16 is provided at one side of the slot with a recess or notch 19 adapted to receive the rod 13 and thus hold the same in its retracted position, the rod being capable of sufficient lateral movement to permit it to be moved into and out of the retaining notch. The receptacle 5 has at its upper end an outwardly flared top portion 20 shaped to prevent oil from splashing over the edge of the receptacle. The receptacle is provided with a suitable device to retain the spout in its upright position and, in the form shown in Figs. 1 and 2, this retaining device comprises a pair of resilient members or fingers 21 rigidly secured to the top portion 20 of the receptacle.

For the purpose of causing the valve 10 to be closed when the spout is secured in its upright position I have provided a device which will be actuated by the spout to release the valve operating device from the recess 19 and thus cause the valve to be closed by the spring 18 as the spout is moved to its final position. As shown in Figs. 1 and 2 this device comprises a bar 22 slidably mounted on the guide 16, the bar having a longitudinal slot 23 to receive a stud 24 carried by the guide. The rear end of the bar is tapered or beveled, as shown at 25, and this tapered portion is so arranged that when the bar is in its foremost position it will not be in operative engagement with the valve operating rod but when the bar is moved rearwardly the tapered edge of the bar will engage the rod and force the same out of the recess 19. The bar is held normally in its foremost position by a spring 26, which may be of any suitable character but which is here shown as a tension spring connected with the bar and with the top portion 20 of the can. The forward portion of the bar extends beyond the forward side of the receptacle and, in the present instance, extends through an opening in the top portion 20 thereof. The projecting end of the bar lies in the path of the spout as the latter is moved to its upright position and will be engaged by the spout and moved inwardly as the spout completes its upward movement. When the spout retaining means is at the top of the can the controlling bar may be so arranged with relation thereto that the spout can not operatively engage the retaining means until the bar has been actuated to cause the valve to be closed. In the present arrangement the bar projects between the fingers 21 such a distance that the spout can not be inserted between those fingers without actuating the bar to release the valve operating device.

In that form of the device shown in Fig. 3 the valve releasing device is in the form of a bar 27 pivotally mounted at 28 on the guide 16 and has its rear end arranged alongside of the valve actuating rod 13. The forward end of the rod extends through a slot 29 in the top portion 20 of the receptacle 5 and is arranged in such relation to the spout retaining device that when the spout is moved into operative engagement with the retaining device the rod will be moved about its axis in a direction to cause the rear end thereof to force the valve operating rod out of its retaining recess. The spout retaining device may be of any suitable character but, in the present instance, I have shown a single retaining member 30 and the outer end portion of the rod 27 cooperates with this single member in retaining the spout in its upright position, the end portion of the rod being preferably inclined, as shown at 31, to facilitate the insertion of the spout and to insure sufficient movement being imparted to the rod to release the valve.

In the mechanism as above described the controlling device will prevent the spout from being moved into operative engagement with the spout retaining device so long as the valve is open but the controlling device may be moved by pressure exerted on the spout to release the valve and cause it to be closed, thereby permitting the spout to engage the retaining device. In Figs. 4 and 5 I have shown another form in which the controlling device is so connected with the valve operating mechanism as to be controlled thereby. In those figures the can 33 is similar to that above described and comprises a bottom 34, a top 35 and a tiltable spout 36. The valve 37 is carried by one end of a lever 38 which is pivotally mounted between its ends on a bracket 39. An actuating rod 40 is connected with that end of the lever 38 opposite the valve and has vertical movement in a guide 41. A spring 42 acts on the rod to hold the same normally in its elevated position, with the valve closed, and the rod has a thumb piece 43 by means of which it may be depressed against the action of the spring 42 to open the valve. The guide 41 has a slot 44 into which a narrow portion of the rod 40 may be inserted to hold the valve in its open position. The spout retaining device is in the form of a hook 45 secured to the front of the can.

The device which controls the operative engagement of the spout with the hook 45 is in the form of a finger or guard 46 slidably mounted in an opening in the top 35 of the can and movable into and out of a position to close the open side of the hook 45. This finger is pivotally mounted on the upper end of a lever 47 which is pivotally mounted near its lower end on a bracket 48. That end of the lever below the bracket is connected by a link 49 with the rod 40, the arrangement being such that the vertical movement of the rod to open and close the valve will move the finger or guard 46 into and out of an operative position with relation to the hook 45. When the valve is in its closed position, as shown in full lines in Fig. 5, the finger will be withdrawn and the spout may be engaged with the hook but when the valve operating rod 40 is depressed to open the valve the finger is moved forwardly across the open side of the hook and the spout cannot be engaged with the hook until the rod has been positively operated to retract the finger.

While I have shown and described one embodiment of the invention, together with certain modifications thereof, I wish it to be understood that I do not desire to be limited to the details thereof as various modifications may occur to a person skilled in the art.

Having now fully described my invention, what I claim as new and desire to secure by Letters Patent, is:

1. In a liquid dispensing can comprising a receptacle, a spout leading from the lower portion of said receptacle, and a valve to control the discharge of liquid through said spout, means arranged to be actuated by said spout when the latter is moved to an upright position to cause said valve to be closed.

2. In a liquid dispensing can comprising a receptacle, a tiltable spout leading from the lower portion of said receptacle, means for retaining said spout in an upright position, a valve to control the discharge of liquid through said spout, spring means to close said valve, and means for retaining said valve in its open position, means arranged to be actuated by said spout when it is moved to said upright position to release said valve from said valve retaining means and permit the same to be closed by said spring means.

3. In a liquid dispensing can comprising a receptacle, a tiltable spout leading from the lower portion of said receptacle, a valve to control the discharge of liquid through said spout, and means to close said valve, a device arranged to be actuated by said spout when the latter is moved to an upright position and to cause said valve closing means to close said valve.

4. In a liquid dispensing can comprising a receptacle, a tiltable spout leading from the lower portion of said receptacle, a valve to control the discharge of liquid through said spout, operating means for said valve including a spring to move the valve to its closed position, and means to retain said valve operating means in a position to hold said valve open, a rod slidably mounted on said receptacle and arranged to be actuated by said spout when the latter is moved to an upright position to release said valve operating means from said retaining means.

5. In a liquid dispensing can comprising a receptacle, a tiltable spout leading from the lower portion of said receptacle, and a valve to control the discharge of liquid through said spout, means arranged to be engaged by said spout when the latter is moved to an upright position to cause said valve to be closed and to retain said spout in said upright position.

6. In a liquid dispensing can comprising a receptacle, a tiltable spout leading from the lower portion of said receptacle, a valve to control the discharge of liquid through said spout, and means to retain said valve in its open position, means arranged to be engaged by said spout when the latter is moved to an upright position to retain said spout in said upright position and to release said valve from said retaining means.

7. In a liquid dispensing can comprising a receptacle, a tiltable spout leading from the lower portion of said receptacle, a valve to control the discharge of liquid through said spout, and means to retain said valve in its open position, a spout retaining member secured to the upper portion of said receptacle, and a valve releasing device having a part arranged to be actuated by said spout when the latter is moved into engagement with said retaining member.

8. In a liquid dispensing can comprising a receptacle, a tiltable discharge spout leading from the lower portion of said receptacle, a valve to control the discharge of liquid through said spout, and a device to retain said spout in an upright position, means controlled by the movement of said spout into operative engagement with said retaining device to cause said valve to be closed.

9. In a liquid dispensing can comprising a receptacle, a tiltable discharge spout leading from the lower portion of said receptacle, a valve to control the discharge of liquid through said spout, and a device to retain said spout in an upright position, means for closing said valve comprising a part arranged to be engaged and actuated by said spout when the latter is moved into operative engagement with said spout retaining device.

10. In a liquid dispensing can comprising a receptacle, a tiltable discharge spout leading from the lower portion of said receptacle, a valve to control the discharge of liquid through said spout, means to retain said valve in its open position, and a device to retain said spout in an upright position, a device to release said valve from its retaining means, said releasing device having a part arranged to be actuated by the movement of said spout into operative engagement with said spout retaining device.

11. In a liquid dispensing can comprising a receptacle, a tiltable spout leading from the lower portion of said receptacle, a valve to control the discharge of liquid through said spout, a spring actuated member to normally close said valve, and means to retain said member in a retracted position, a spout retaining member arranged to engage said spout when the latter is moved to an upright position, and a device arranged to be actuated by said spout to release said spring actuated member when said spout is moved into engagement with its retaining member.

12. In a liquid dispensing can comprising a receptacle, a tiltable discharge spout leading from the lower portion of said receptacle, a valve to control the discharge of liquid through said spout, a device to operate said valve, means to retain said operating device in a position to hold said valve open, and a device to retain said spout in an upright position, means actuated by said spout when the latter is moved into operative engagement with said spout retaining device to release said valve operating device from its retaining means.

13. In a liquid dispensing can comprising a receptacle, a tiltable spout leading from the lower portion of said receptacle, a valve to control the discharge of liquid through said spout, a valve operating device, a stop to retain said device in a position to open said valve, and a device to retain said spout in an upright position, a movable device having a part arranged to be actuated by said spout when the latter is moved into operative engagement with said spout retaining device and also having a part to move said valve operating device out of engagement with said stop.

14. In a liquid dispensing can comprising a receptacle, a tiltable spout leading from the lower portion of said receptacle, a valve to control the discharge of liquid through said spout, a valve operating member connected with said valve, a guide carried by said receptacle and through which said valve actuating member extends, a spring acting on said valve operating member to move the same in a direction to close the valve, said guide having a recess to receive said operating member and hold the same in its retracted position, and a device to retain said spout in an upright position, a bar movably mounted on said guide, having a part to engage said operating member and move the same out of said recess and also having a part arranged to be engaged and actuated by said spout when the latter is moved into operative engagement with said spout retaining device.

15. In a liquid dispensing can comprising a receptacle, a tiltable spout leading from the lower portion of said receptacle, a valve to control the discharge of liquid through said spout, a valve operating member connected with said valve, a guide carried by said receptacle and through which said valve actuating member extends, a spring acting on said valve operating member to move the same in a direction to close the valve, said guide having a recess to receive said operating member and hold the same in its retracted position, and a device to retain said spout in an upright position, a bar slidably mounted on said guide, having an inclined edge to engage said valve operating member and move the same from said recess and also having a part arranged to be engaged and actuated by said spout when the latter is moved into operative engagement with said spout retaining device, and a spring acting on said bar to hold the same normally in a position to be engaged by said spout.

16. In a liquid dispensing can comprising a receptacle, a tiltable discharge spout leading from the lower portion of said receptacle, a valve to control the discharge of liquid through said spout, a device to actuate said valve, and a device to retain said spout in an upright position, a device having a part to prevent said spout from operatively engaging said retaining device and also having a part so arranged with relation to said valve actuating device that the first mentioned part may be moved to an inoperative position when said valve actuating device is operated to close said valve.

17. In a liquid dispensing can comprising a receptacle, a tiltable discharge spout leading from the lower portion of said receptacle, a valve to control the discharge of liquid through said spout, means to retain said valve in its open position, and a device to retain said spout in an upright position, a device controlled by said valve retaining means to prevent said spout from operatively engaging said spout retaining device while said valve is retained in its open position.

18. In a liquid dispensing can comprising a receptacle, a tiltable discharge spout leading from the lower portion of said receptacle, a valve to control the discharge of liquid through said spout, means to retain said valve in its open position, a device to retain said spout in an upright position, and a device having a part movable into and out of a position to prevent said spout from operatively engaging said spout retaining device and also having a part so arranged with relation to said valve retaining means as to prevent the movement of said first mentioned part from said position while said valve is retained in its open position.

19. In a liquid dispensing can comprising a receptacle, a tiltable discharge spout leading from the lower portion of said receptacle, a valve to control the discharge of liquid through said spout, a device to actuate said valve, and a device to retain said spout in its upright position, a controlling device comprising a part mounted for movement into and out of a position to prevent said spout from engaging said spout retaining device, and means for so connecting said controlling device with said valve actuating device that said part will be retained in a position to prevent said spout from engaging said spout retaining device when said valve actuating device is in a position to open said valve.

20. In a liquid dispensing can comprising a receptacle, a tiltable discharge spout leading from the lower portion of said receptacle, a valve to control the discharge of liquid through said spout, a device to actuate said valve, and a hook to receive said spout and retain the same in an upright position, a member mounted for movement into and out of a position to close the open side of said hook, and means for so connecting said member with said valve actuating device that the movement of the latter to open said valve will move said member to a position to close the open side of said hook and the movement of said valve actuating device to close said valve will withdraw said member from said position.

21. In a liquid dispensing can comprising a receptacle, a tiltable discharge spout leading from the lower portion of said receptacle, a valve to control the discharge of liquid through said spout, a spring actuated device to actuate said valve, and a stop to hold said device against movement by said spring in a direction to close the valve, a device to retain said spout in an upright position comprising two members adapted to receive said spout between them, one of said members being movable with relation to the other member and having a part adapted to engage said valve actuating device when the latter is in engagement with said stop and hold said movable member in a position to be actuated by the insertion of said spout between the two members to release said valve actuating device from said stop.

22. In a liquid dispensing can comprising a receptacle, a tiltable discharge spout leading from the lower portion of said receptacle, a valve to control the discharge of liquid through said spout, a spring actuated device to actuate said valve, and a stop to hold said device against movement by said spring in a direction to close the valve, a device to retain said spout in an upright position comprising a stationary member and a movable member, said movable member being pivotally mounted between its ends, having on one side of its pivotal axis an inclined part adjacent to said stationary member and having on the other side of said axis a part adapted to engage said valve actuating device when the latter is in engagement with said stop, said parts being so arranged that the insertion of said spout between said stationary member and the inclined part of said movable member will cause said movable member to be moved in a direction to move said valve actuating device out of engagement with said stop.

23. In an oil can embodying a vertically swingable spout, a valve for said spout, means for opening said valve, catch means for holding the valve in open position when moved to said position, and means for closing the valve upon release of said catch means; a retaining device secured to said can for engagement by said spout to hold the latter normally raised, and a releasing rod for said catch means having an end arranged to prevent the operative engagement of said spout with said retaining device until the rod is so shifted as to release said catch means.

In testimony whereof, I attach my signature hereto.

PAUL D. FULTON.